United States Patent [19]
Pagett

[11] Patent Number: 5,482,125
[45] Date of Patent: Jan. 9, 1996

[54] STEERABLE FOUR WHEEL DRIVE VEHICLE

[75] Inventor: Jeffery M. Pagett, Griffith, Australia

[73] Assignee: J. Pagett Industries Pty Limited, New South Wales, Australia

[21] Appl. No.: 244,705

[22] PCT Filed: Jul. 14, 1994

[86] PCT No.: PCT/AU92/00649

§ 371 Date: Jun. 3, 1994

§ 102(e) Date: Jun. 3, 1994

[87] PCT Pub. No.: WO93/10735

PCT Pub. Date: Jun. 10, 1993

[30] Foreign Application Priority Data

Dec. 5, 1991 [AU] Australia ............................ PK9870

[51] Int. Cl.⁶ .................................................... B62D 9/00
[52] U.S. Cl. ..................... 180/6.32; 180/6.5; 180/65.5; 180/907
[58] Field of Search ..................... 180/6.5, 6.48, 180/6.24, 6.32, 6.2, 907, 65.5, 65.1, 252, 253, 342

[56] References Cited

U.S. PATENT DOCUMENTS

| 2,122,924 | 7/1938 | Ammen et al. ................... 280/95.1 |
| 4,483,405 | 11/1984 | Noda et al. ....................... 180/236 X |
| 4,805,712 | 2/1989 | Singleton .......................... 180/907 X |
| 5,311,957 | 5/1994 | McLaurin et al. ............... 180/907 X |

FOREIGN PATENT DOCUMENTS

| 0315210 | 5/1989 | European Pat. Off. .. |
| 6712 | 3/1909 | United Kingdom . |
| 2161434 | 6/1985 | United Kingdom . |

*Primary Examiner*—Kevin T. Hurley
*Attorney, Agent, or Firm*—Jones & Askew

[57] ABSTRACT

A four wheel drive vehicle suitable for use as a wheelchair or the like. The vehicle has a steering arrangement which allows the vehicle to be steered merely by selectively driving the left and right wheels. The steering arrangement requires at least one of the front and rear pairs of wheels to be castor mounted so as to be freely pivotal around respective pivot pins, with the pair of castor mounted wheels being linked so that they pivot generally in unison. Preferably, each of the castor mounted wheels rotate in a vertical plane which is laterally spaced from the pivot pins.

15 Claims, 11 Drawing Sheets

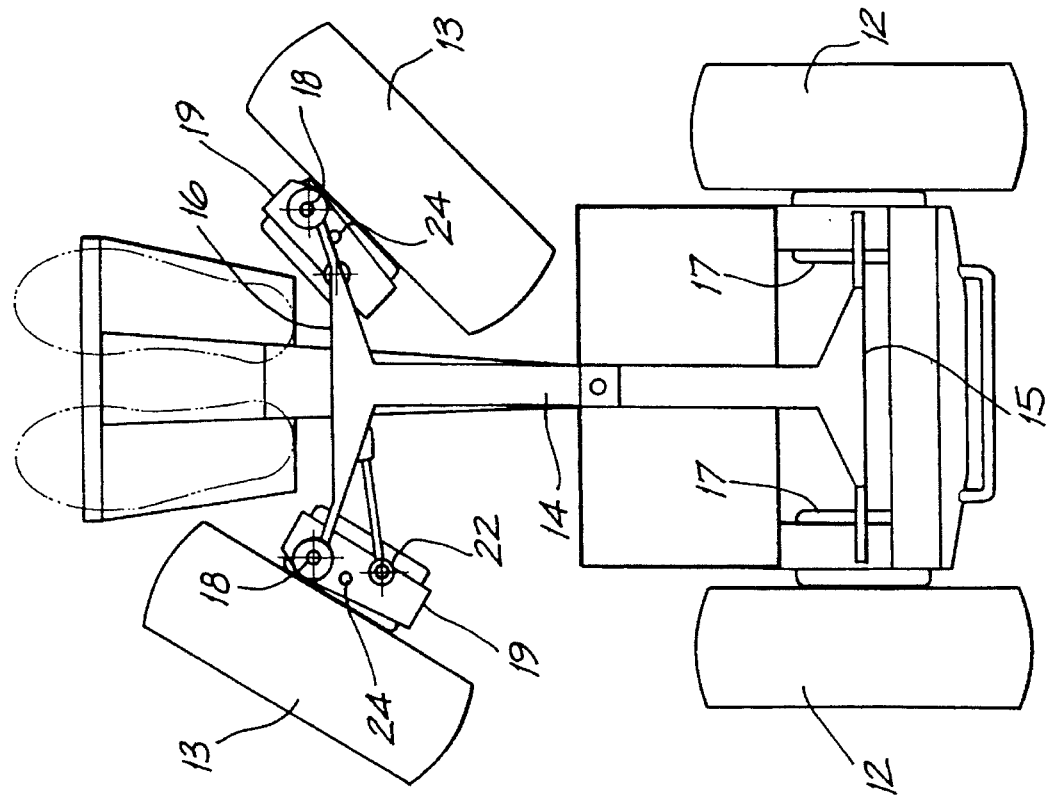
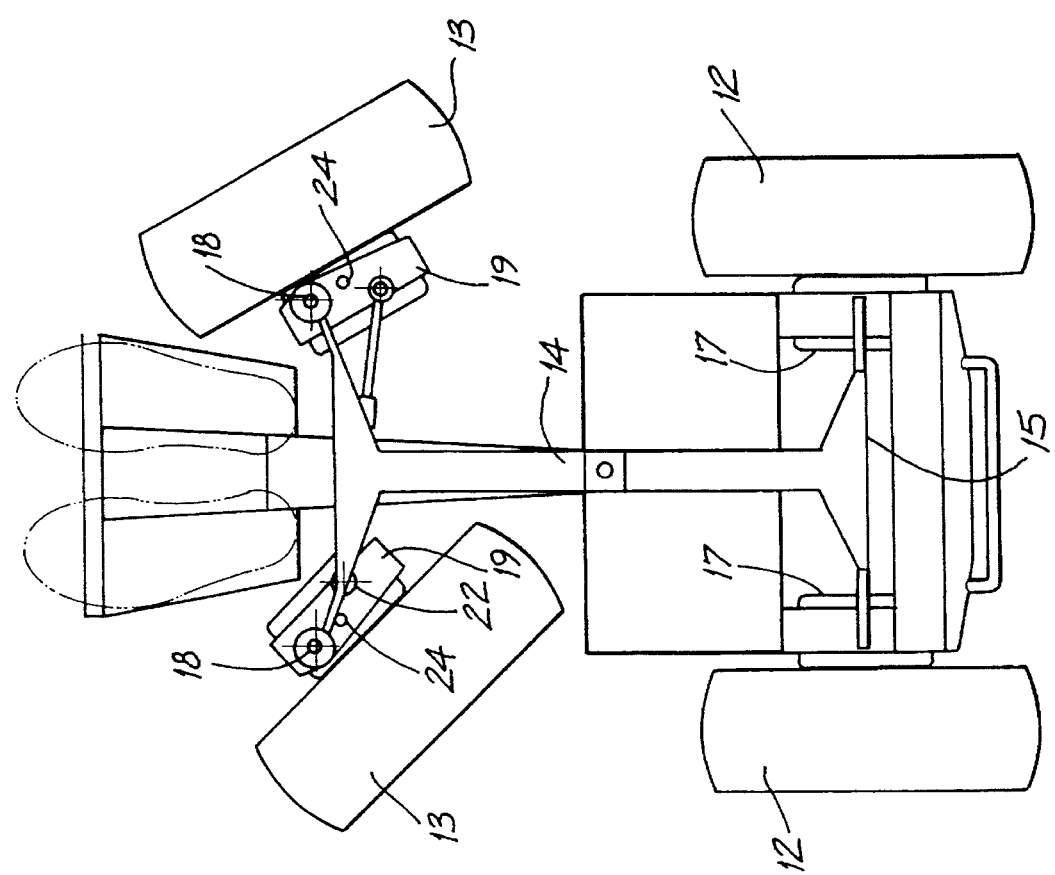

STEERABLE FOUR WHEEL DRIVE VEHICLE

TECHNICAL FIELD

The present invention relates to a steerable four wheel drive vehicle and in particular to the use of such a vehicle as a wheelchair.

BACKGROUND ART

It is known to provide a wheelchair with drive to each of its four wheels. Such vehicles are conventionally steered by the skid steer principle or by providing that some or all of the wheels are steered by a positive steering mechanism. The skid steer principle provides a high degree of manoeuvrability to a four wheel drive vehicle and is for this reason used in tractors, armoured personnel carriers and the like. This system is not satisfactory for wheelchairs which are likely to be used indoors as the skid steering of the wheelchair would damage flooring surfaces such as carpets. The provision of positive steering mechanisms on wheelchairs adds to the weight, complexity and cost of wheelchairs. The present invention is directed to a four wheel drive vehicle incorporating an alternative steering mechanism.

DISCLOSURE OF THE INVENTION

The present invention consists of a vehicle having a frame, a pair of front wheels and a pair of rear wheels mounted on the frame, a steering means wherein at least one of the pairs of wheels are castor mounted on the frame so that each wheel of that pair freely pivots about a respective vertical axis, the steering means further comprising a linkage means connecting the pair of castor mounted wheels so that the castor mounted wheels pivot generally in unison, a motor drivably connected to each wheel for rotating that wheel in its vertical plane, and control means to control power to be independently delivered to each one of at least one of the pairs of wheels.

Preferably, each castor mounted wheel is rotatable in a generally vertical plane which is laterally spaced from the vertical pivotal axis of that wheel.

Preferably, the linkage means is a rigid elongate bar pivotably connected to the castor mounting of each one of the pair of castor mounted wheels to thereby interconnect the pair of castor mounted wheels, the pivotal connections of the elongate bar being in each case about another vertical axis laterally spaced from the vertical pivotal axis of the respective castor mounted wheels In a preferred embodiment of the invention the vehicle is a wheelchair having a chair mounted on the frame. The control means are preferably mounted on an arm of the chair but may be mounted remotely of it.

The vehicle is preferably an electric vehicle using a battery or batteries to drive an electric motor connected to each of the four wheels of the vehicle. These motors are preferably printed circuit motors which deliver high torque at low speeds.

The castor mounted wheels may have either a positive or a negative trail. A positive trail means that the horizontal axis of rotation of the wheel lies behind the vertical axis of rotation of the castor mechanism relative to the frame. A negative trail implies that the axis of rotation of the wheel is in front of the castor axis.

In order to provide a wheelchair with a tight turning circle and minimum physical dimensions it is preferred that the front wheels of the wheelchair are castor mounted and are given a positive trail by an amount less than the radius of the wheel. This allows the front wheels to arc around the respective ends of the front frame member of the wheelchair while still leaving sufficient space between the full lock positions of the wheels for a footrest to be provided between the wheels in front of a front frame member. In this respect it is also desirable that the free end portions of the front frame member are angled forwardly on either side of the footrest. It is, of course, a requirement that the wheels do not contact either the footrest or the feet of a user resting thereon. The stop members must therefore be positioned to stop such contact.

In the simplest embodiment of the invention the rear wheels will be non-steerable. In this arrangement the drive means of the left hand wheels should be coupled to drive in the same direction and similarly the right hand wheels should be so coupled. In this arrangement the left and right drive means are independent of one another.

If desired the rear wheels of the vehicle may also be castor mounted on the frame to pivot about respective vertical axes. In this case the castor mounting of the front and rear wheels is interconnected so that the pivotal movement of the front and rear wheels is generally synchronised. This interconnection may also be such that the direction of pivotal movement of the castor mounting of the rear wheels is in the same direction as that of the front wheels, allowing the vehicle to "crab walk", or alternatively the movement of the castor mountings of the front and rear wheels may be in opposite directions (ie so that the rotational plane of the wheels are generally tangential to a common centre axis) allowing the vehicle to turn in a circle. In particularly preferred embodiments of the invention, the interconnection is such that it may be selectively changed between these two modes. In the case of the "circling" mode of interconnection the drive means front left and right rear wheels are arranged to drivably rotate the respective wheels together and the drive means for front right and left rear wheels are arranged to drivably rotate the respective wheels together. In the "crab walking" mode of interconnection the left hand wheel drive means are drivably linked and the right hand wheel drive means are drivably linked.

BRIEF DESCRIPTION OF THE DRAWINGS

Hereinafter provided by way of example only is a preferred embodiment of the invention described with reference to the accompanying drawings in which:

FIG. 3 is a schematic plan view of a wheelchair according to a second embodiment of the present invention with the front wheels turned to the left;

FIG. 4 is a schematic plan view of the wheelchair of FIG. 3 with the wheels turned to the right;

DETAILED DESCRIPTION OF THE PREFERRED EMBODIMENTS

Figure 1:
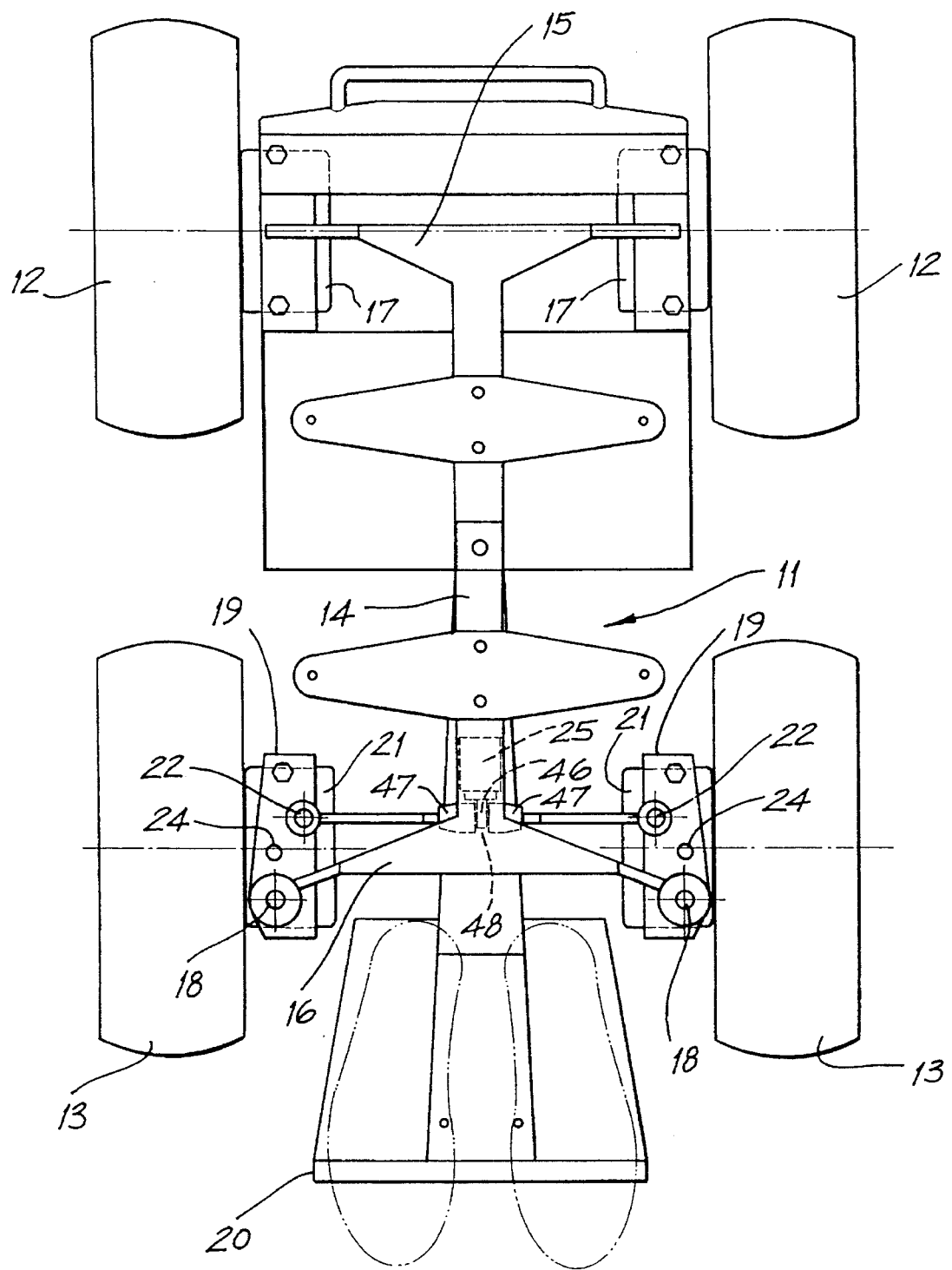
FIG. 1 is a schematic plan view of a vehicle according to the present invention.
Figure 2:
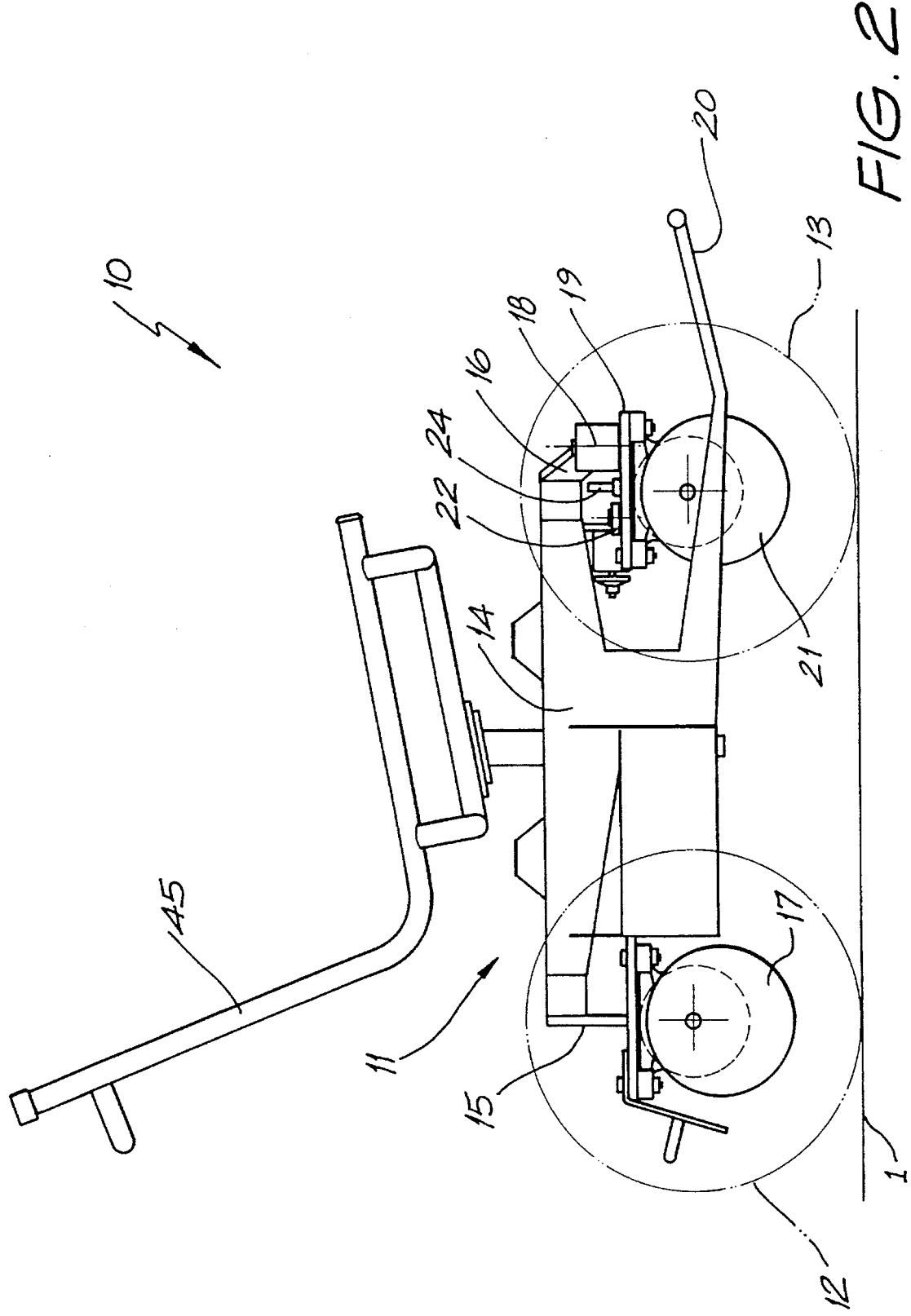
FIG. 2 is a schematic detailed side elevational view of the vehicle of FIG. 1.
Figure 5:
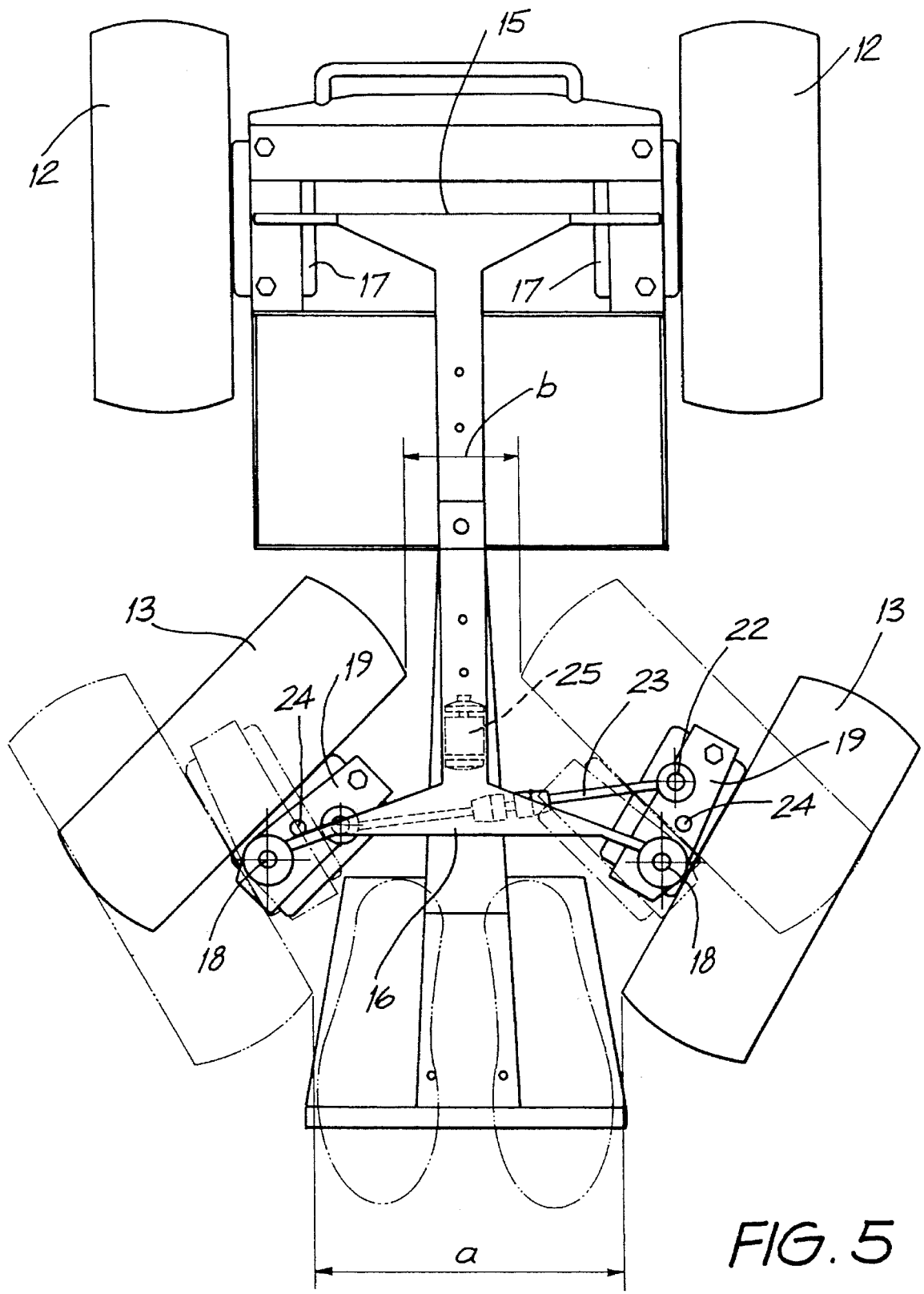
FIG. 5 is a schematic plan view of the wheelchair of FIG. 3 showing the clearance between the front and rear edges of the front wheels of the wheelchair at extreme lock in either direction.

Referring to FIGS. 1–5, the vehicle 10 comprises a frame 11, a pair of non-steerable rear wheels 12 mounted on the frame 11 and a pair of castor mounted front wheels 13 mounted on the frame 11. The frame 11 is essentially H-shaped having a central longitudinal member 14, a rear transverse member 15 supporting the rear wheels 12 and a front transverse member 16 supporting the front wheels 13. A printed circuit electric motor 17 is mounted at each of the free ends of the rear transverse member 15. The rear wheels 12 are each mounted on the drive spindle of one of the motors 17. These motors 17 are geared at 50:1 and draw about 21 amps at peak load.

The free ends of the front transverse frame member 16 are each provided with a vertical bore in which is rotatably disposed a pivot pin 18. The lower end of each pin 18 is connected to a plate 19 on which is mounted an electric motor 21 similar to the motors 17. The front wheels 13 are each mounted on the horizontally extending drive spindle of one of the motors 21. The spindles of the motors 21 lie a distance behind the vertical pivotal axis of the respective pivots 18, the wheels 13 thus being castor mounted with a positive trail. Further, the front wheels 13 are rotatable about the spindles of the motors 21 in a generally vertical plane which is laterally spaced from the respective pivot pin 18.

Each plate 19 carries a vertically extending pin 22 rearwardly of the motors 21. The pins 22 are linked by a rigid bar 23 which is pivotably mounted at opposite ends to each of the pins 22. Adjacent the pins 22, the plate 19 carries a vertically upwardly projecting stop member 24 adapted to engage with the frame 11 at the limit of pivotal movement of the wheels 13 about the pivot pins 18.

Figure 12:
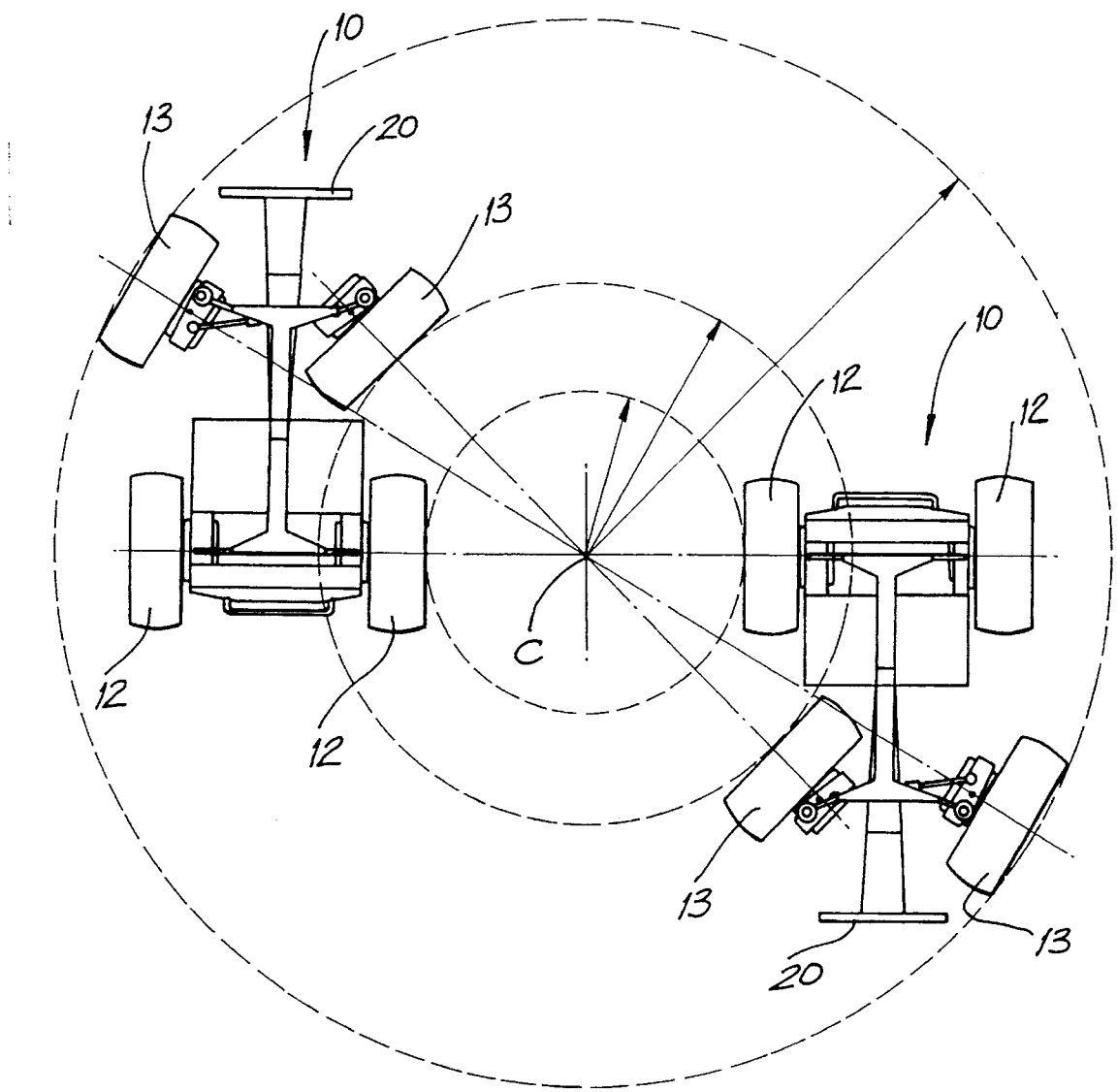
FIG. 12 is a schematic plan view of the wheelchair of FIG. 2 in full lock to the right and the turning circle achieved thereby.

As can be seen in the drawings (refer FIGS. 1,3 and 4), when the wheels 13 are orientated in the straight forward position relative to the frame, the spacing between the pins 22 is smaller than the spacing between the pivot pins 18. More particularly, each of the pins 22 are positioned rearwardly of and inwards from the associated pivot pin 18. This arrangement allows for an advantageous variable pivoting movement of the wheels 13. That is, in the full left lock position of the wheels 13 (refer FIG. 3), the left wheel extends at an angle with respect to the frame 11 which is larger than that of the right wheel. Similarly, in the full right lock positions of the wheels 13 (refer FIG. 4), the right wheel extends at an angle with respect to the frame 11 which is larger than that of the left wheel. This is advantageous since, for the vehicle to turn about an imaginary centre point C (refer FIG. 12) which is spaced from, and on one side or the other of the vehicle, the left and right wheels should each extend generally tangentially with respect to that centre point C. If the wheels were pivoted absolutely together (i.e. uniformly), they would remain generally parallel to each other at all turning positions thereof and could never be tangential to the same turning centre point C. This would contribute to an inefficient and therefore undesirable scrubbing action of the wheels 13 during turning of the vehicle.

An alternative arrangement which effectively links the pivotal movements of each of the front wheels 13 includes cogwheels or the like (not shown) mounted on each of the pivot pins 18 so that each cogwheel rotates together with its associated pivot pin 18. Further, a drive chain, toothed belt or the like (not shown) extends around each cogwheel so that the cogwheels rotate together. Accordingly, pivotal movement of one of the wheels 13 will cause corresponding pivotal movement of the other wheel 13. Such an arrangement could therefore replace the rigid bar 23 and pivot pins 22 described above. It will be appreciated, however, that this alternative arrangement is less desirable since it does not allow for the advantageous variations in the angle of pivot of the wheels 13 between the full left lock and full right lock positions, which is achieved with the rigid bar 23/pivot pins 22 described above.

Accordingly, a person skilled in the art will appreciate that numerous different linkage arrangements between the respective front wheels may be used whilst still providing for the required linking of the wheels 13 so that they pivot generally in unison.

The motors 21 are powered by a pair of electric batteries (not shown) mounted on the frame 11 beneath a chair 45. An electronic controller (not shown) having a joy stick control is mounted on an arm of the chair. Manipulation of the joy stick allows the left hand wheels 12 and 13 to be driven independently of the right hand wheels 12 and 13.

Accordingly, when the motor of, for example, the left front wheel 13 is driven, the driving force being applied against the ground surface will create a moment force about the pivot pin 18 so as to urge the left front wheel 13, and also the right front wheel 13 (by means of the rigid bar 23 interconnecting the pivotal movements of the front wheels 13) to pivot to the left about their respective pivot pins 18 so as to steer the vehicle to the right.

In use, if the four motors are driven forward simultaneously with the same power and with the front wheels 13 already aligned with the rear wheels 12, the wheelchair 10 will travel forwardly in a straight line. If however the left hand wheels 13 are first caused to reverse and the right hand wheels 13 are driven forwardly, the two front wheels 13 will be caused to pivot about their respective pivot pins 18 into a full left lock position whilst the vehicle remains generally stationary. Thereafter, when the four motors are driven forwardly with an appropriate distribution of power compensation for the different radii of the wheels from the centre of turning C, the wheelchair will be driven to the left and will continue to turn left until the front wheels 13 are caused to return to the straight ahead position. The wheelchair can similarly be driven to the right. The bar 23 causes the wheels 13 to be forced to castor together rather than being able to move independently.

It will be appreciated that the steering arrangements on the left and right front sides of the frame 11 are generally mirror images of each other relative to the central longitudinal plane of the frame 11. Accordingly, when equal power is used to drive each of the left and right front wheels in the same direction, the respective moment forces will cancel each other out, such that the wheels will remain in the same orientation relevant to the frame 11. Conversely, and as noted above, if the respective left and right front wheels 13 are driven in opposite directions, the moment forces will be cumulative, whereby the wheels 13 will be caused to pivot about their respective pivot pins 18 with a maximum moment force and therefore at a faster rate. The wheels 13 would be driven in this manner in order to, for example, provide a power steer effect whilst the wheelchair is stationary.

Because the wheels 13 have a positive trail and are laterally spaced from the pivot pins 18, the pivotal movement of the wheel 13 will cause the wheel 13 to transcribe a small arc about the pivot pin 18. This means that the wheels 13 will always rotate at least a part of a revolution in order to effect the pivoting movement about the pivot pin 18. Further, as the pneumatic tires which are intended to be used with the wheelchair 10 are very wide and have a certain amount of tread, the rolling and the pivoting movement of the wheels 13 will need to overcome a certain amount of rolling resistance which may contribute to the operation of the steering arrangement which is nevertheless primarily determined by the power being provided to each wheel 13. More particularly, the rolling resistance of the tires, in conjunction with the rotational resistance or inertia of the motor and gearbox, creates a lag force which, when the other wheel 13 is being driven, translates into a moment force about the respective pivot pin 18, which moment force works in conjunction with the moment force created by the driven other wheel 13 to provide a moderate turning moment to the wheels 13, either to the left or to the right.

The use of the front castoring wheels 13 linked by the bar 23 provides a very simple, inexpensive and reliable steering system for the wheelchair. The geometry of the wheelchair may be so selected that there will be substantially no skidding of the wheels over floor coverings when the vehicle is used.

If desired it is possible to provide the wheelchair with a locking mechanism 25 which selectively prevents castoring movement of the front wheels 13 when the wheelchair is desired to be driven straight forward over uneven ground (ie. where one wheel 13 may become separated from contact with the ground 1), or when the operator wishes to easily reverse the vehicle 10.

The mechanism comprises a solenoid 25 operated pin 46 which is biased by a spring (not shown) into an extended position and, when the solenoid 25 is activated, the pin 46 is retracted. A pair of tapered collars 47 is provided on the bar 23 which define a recess 48 to receive the pin. In use, the operator deactivates the solenoid 25 which allows the pin 46 to move into the extended position. When the wheels 13 pivot towards the straight forward portion the pin 46 rides up the inclined faces of one of the collars 47 and then engaged in the recess 48 to lock the wheels 13.

The wheelchair according to this invention may be designed as an all terrain type wheelchair able to be driven over uneven ground including being driven on beaches. For this purpose the wheels should be of wide profile and the clearance of the frame and the motor should be sufficient to avoid the vehicle becoming bogged in soft ground and, importantly, to enable the wheelchair to negotiate gutters, steps and the like. For such purposes, the clearance of the frame 11 from the ground should be at least about 150 mm and the tires should have a diameter of about 370 mm.

In the arrangement of FIGS. 1–5, there is also a footrest 20 connected to the front transverse frame member 16 intermediate the wheels 13. The length of the positive trail of the wheels 13 is so selected relative to the radius of the wheels 13 that even at full lock in either direction the wheels will clear the footrest 20 or the feet of a user placed thereon.

In one preferred embodiment the amount of trail is approximately 50 mm. If, for example, this were increased to 75 mm more foot space would be provided by increasing distance a, (FIG.5) however, this would decrease distance b and might lead to fouling of the wheels on the frame 11. On the other hand if the trail were reduced to, say, zero then the distances a and b would be equal. This would not allow sufficient room for the footrest 20 between the wheels 13. The preferred amount of trail with linkage bar 23 and limit stop member 24 provides a sufficient turning arc for the wheelchair 10.

Figure 6:
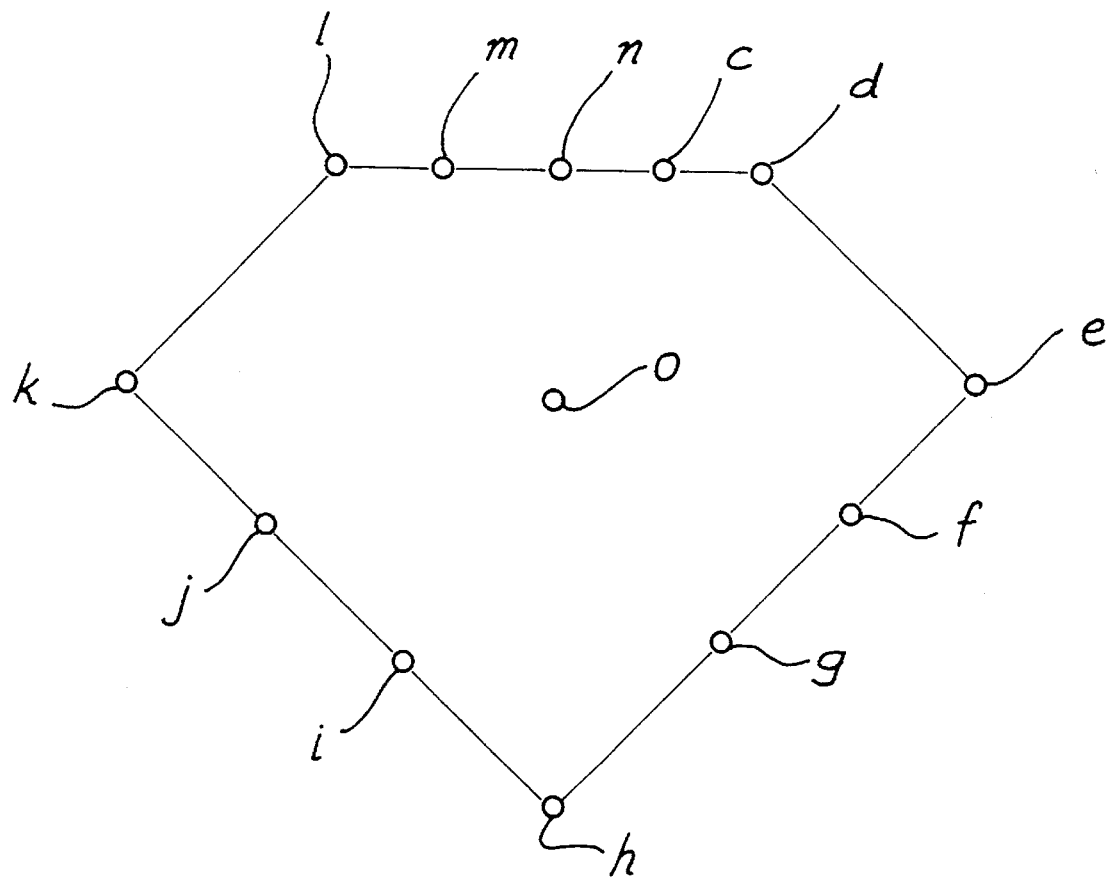
FIG. 6 is a schematic view of the perimeter gate of a joystick control means for driving the motors of the wheelchairs shown in FIGS. 1 to 5.

FIG. 6 shows the joystick gate perimeter for a joystick suitable for use in controlling the wheelchair 10 of FIGS. 1 to 5. In these embodiments of the invention the front and rear left side motors are connected in parallel i.e. both motors are getting the same power in the same direction. The front and rear right side motors are also connected in parallel but are controlled independently of the left side motors.

In the joystick arrangement shown in FIG. 6 the position o represents neutral. In this position no power is provided to either pair of motors. As the joystick is moved from the o position to the perimeter power is provided to one or other or both of the pairs of motors from zero to full power (in this case 24 v DC) in proportion to the distance the joystick is moved from the O position to the perimeter. That is, the power to the respective left pair and right pair of motors is infinitely variable by means of the joystick.

As noted above, the steering of the wheelchair 10 is achieved by providing a differential in the power being applied to the left and right wheels.

The operation of the steering by control of the joystick is illustrated by the following examples.

If the joystick is moved from the o position to the position marked 1 the left hand motors are on 0v DC and the motor and gearbox inertia causes a braking or drag effect on the left hand wheels. At the same time the right hand side motors are receiving 24 v DC, being full power, in a forward direction. These two actions together cause the front wheels to be pivoted to the left while the linkage 23 is correspondingly, moved to the left as seen in FIG. 3. The extent to which the wheels can pivot to the left is limited by the stop member 24 abutting against the front transverse frame member 16. This steering position on the joystick eventually provides full left turn lock (ie, with the wheels is pivoted to the right and the stop member 24 bearing against the frame member 16) in the forward direction of the wheelchair 10. The other control positions of the joystick shown in FIG. 6, provide the following effects:

| Gate Position O | left wheel motors O v DC right wheel motors O v DC giving neutral |
|---|---|
| Gate Position c | left wheel motors 24 v DC forward direction right wheel motors 12 v DC forward direction giving a moderate turning moment to pivot the wheels towards the right turn lock position whilst the vehicle moves in the forward |

| | -continued |
|---|---|
| Gate Position d | direction<br>left wheel motors 24 v DC forward direction<br>right wheel motors 0 v DC<br>giving a maximum turning moment to pivot the wheels towards the right turn lock position whilst the vehicle moves in forward direction |
| Gate Position e | left wheel motors 14 v DC forward direction<br>right wheel motors 14 v DC reverse direction<br>giving a power steering effect to a full right turn lock (as in FIG. 4) while the vehicle remains generally stationary |
| Gate Position f | left wheel motors 0 v DC<br>right wheel motors 24 v DC reverse direction<br>giving a maximum turning moment to pivot the wheels towards the right turn lock position whilst the vehicle moves in the reverse direction |
| Gate Position g | left wheel motors 12 v DC reverse direction<br>right wheel motors 24 v DC reverse direction<br>giving a moderate turning moment to the pivot of the wheels towards the right turn lock position whilst the vehicles moves in the reverse direction |
| Gate Position h | left wheel motors 24 v DC reverse direction<br>right wheel motors 24 v DC reverse direction<br>giving maximum drive in the reverse direction with no turning moment on the front wheels (whilst in a straight position) |
| Gate Position i | left wheel motors 24 v DC reverse direction<br>right wheel motors 12 v DC reverse direction<br>giving a moderate turning moment to pivot the wheels towards the left turn back position whilst the vehicle moves in the reverse direction |
| Gate Position j | left wheel motors 24 v DC reverse direction<br>right wheel motors 0 v DC<br>giving maximum turning moment to pivot the wheels towards the left whilst the vehicle moves in the, reverse direction |
| Gate Position k | left wheel motors 14 v DC reverse direction<br>right wheel motors 14 v DC forward direction<br>giving a power steering effect to the left turn lock position whilst the vehicle remains generally stationary |
| Gate Position l | left wheel motors 0 v DC<br>right wheel motors 24 v DC forward direction<br>giving a maximum turning moment to pivot the wheels towards the left turn lock position whilst the vehicle moves in the forward direction |
| Gate Position m | left wheel motors 12 v DC forward direction<br>right wheel motors 24 v DC forward direction<br>giving a moderate turning moment to pivot the wheels towards the left turn lock portions whilst the vehicles moves in the forward direction |
| Gate Position n | left wheel motors 24 v DC forward direction<br>right wheel motors 24 v DC forward direction<br>giving maximum drive in forward direction with no turning moment on the front wheels (whilst in straight position) |

With the joystick in either positions k or e, there will be a power steering effect whereby the wheels 13 will pivot about the pivot pins 18 at the maximum rate giving a power steering effect whilst the vehicle remains generally stationary, and whereafter the joystick should be moved to another position which then moves the vehicle forwards or rearwards.

With the joystick in positions l, d, f or j, there is a maximum turning moment acting on the wheels 13 to urge the wheels 13 towards the left or the right lock positions whilst the vehicle is moving at least notionally forwards or rearwards.

With the joystick in positions m, c, i or g, there will be a moderate turning moment applied to the wheels 13, which causes the wheels 13 to "tend" to pivot towards the left or the right lock positions whilst the vehicle is primarily moving forwards or rearwards.

With the joystick in either position n or h and the wheels 13 in the straight position, there is in effect no turning moment applied to the wheels 13 about the respective pivot pins 18 due to cancellation of the turning moment effect of the respective driving forces. Accordingly, in these positions of the joystick, the wheels 13 generally remain in the same orientation with respect to the frame whilst the wheelchair is moving straight forward (position n) or rearwards (position h). If the wheels 13 are already turned either to the left or to the right full lock positions, or anywhere therebetween, the wheels 13 will tend to move back towards the straight position due to the different radii of the arcs which the wheels transcribe during turning of the vehicle 10.

Figure 7:
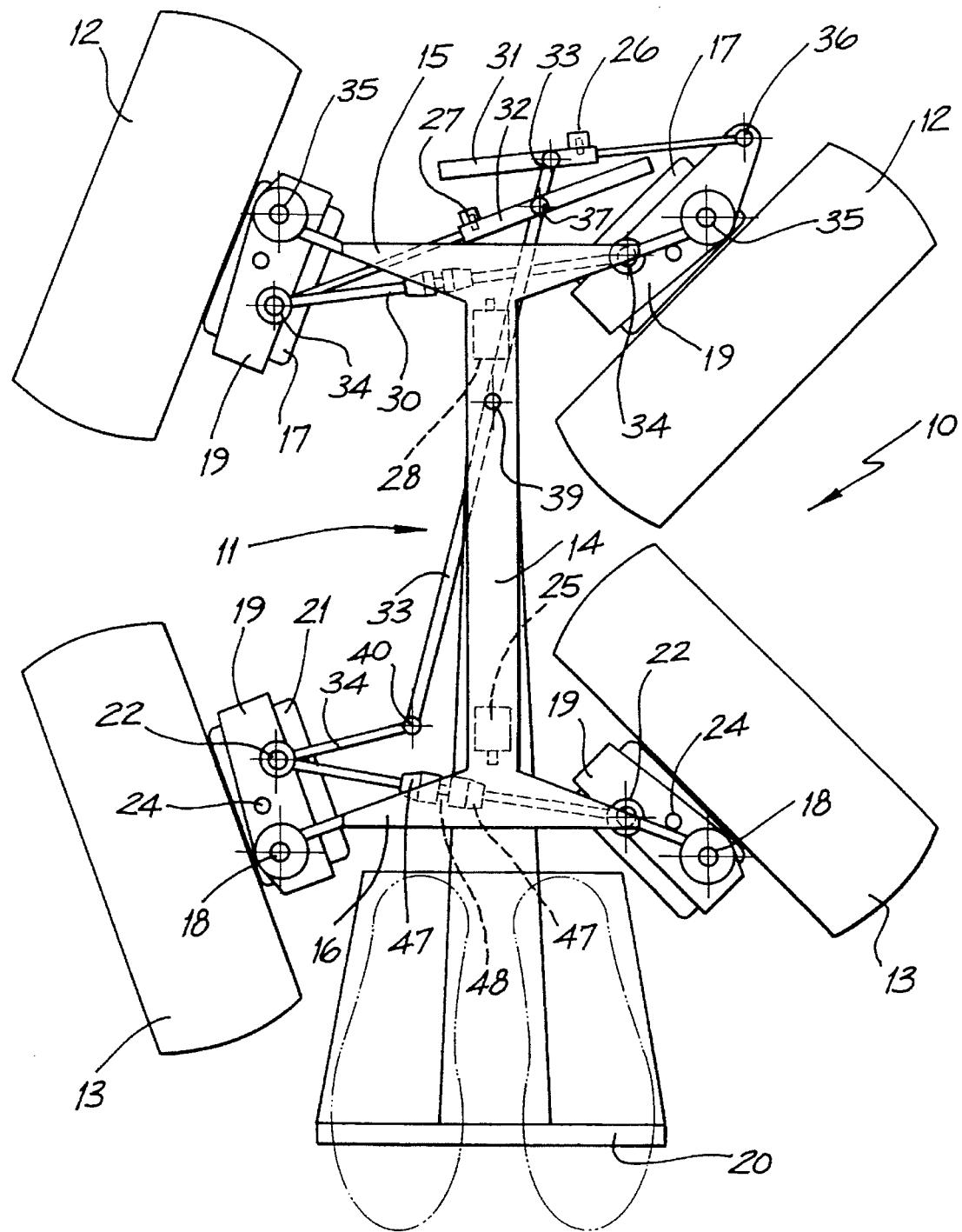
FIG. 7 is a schematic plan view of a wheelchair according to a third embodiment of the present invention showing the front and rear wheels steered into a "circling" mode.
Figure 8:
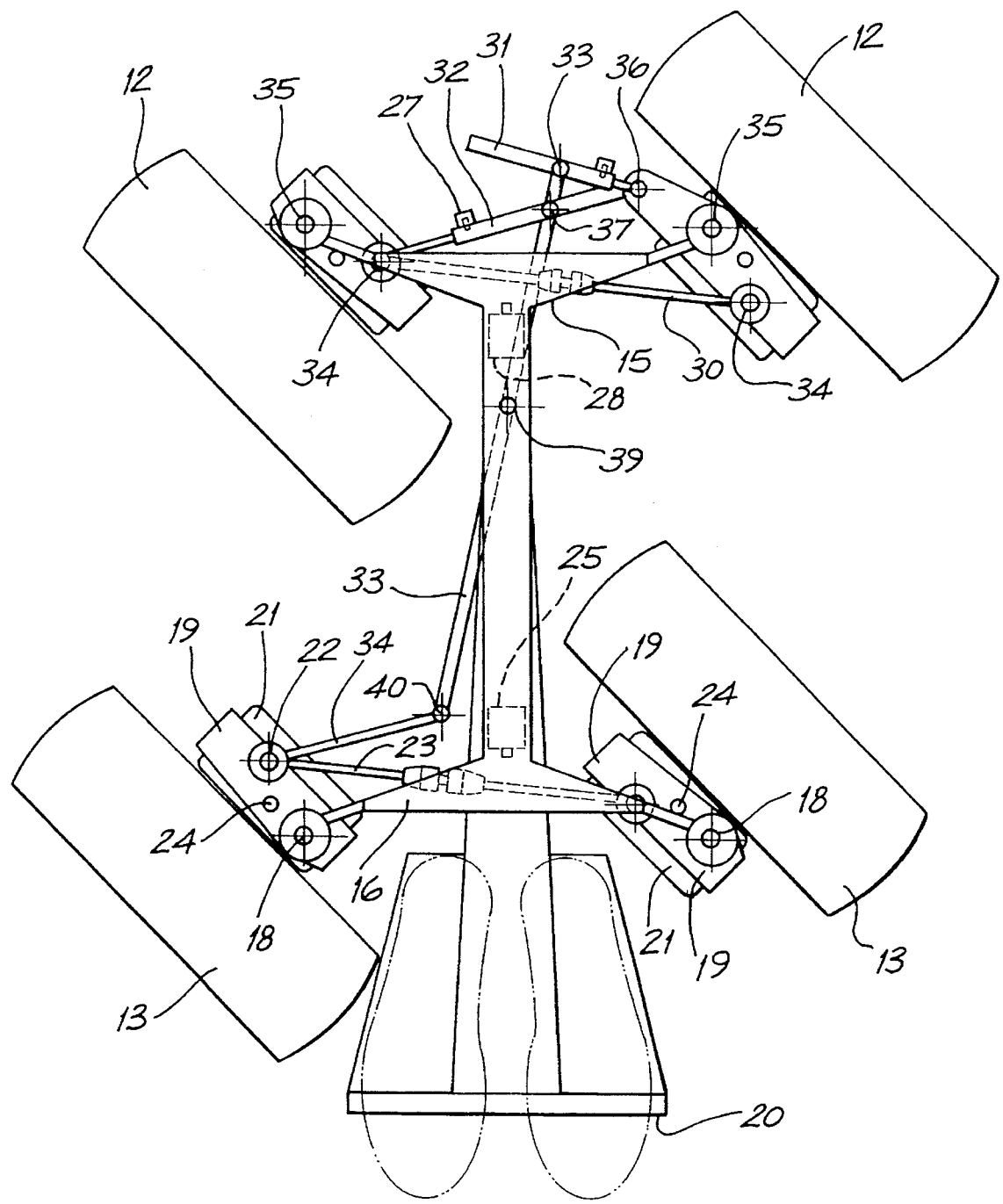
FIG. 8 is a schematic plan view of the wheelchair of FIG. 7 showing the front and rear wheels steered into a "crab walking" mode.

The second embodiment of the invention shown in FIGS. 7 and 8 can be steered through its rear wheels 12 and/or through its front wheels. In the description of this embodiment of the invention those components in common with the embodiment described with reference to FIGS. 1–5 have been given the same numeric designation as they had in the description of those embodiments.

The wheelchair 10 of FIGS. 7 and 8 includes a frame 11 having a central longitudinal member 14, a rear transverse member 15 and a front transverse member 16. The front wheels 13 are castor mounted on plates 19 pivotally connected by pivot pins 18 to the free ends of the front transverse frame member 16 with a positive trail. The rear wheels 12 are also castor mounted on plates 19 pivotally connected by pivot pins 35 to the free ends of the rear transverse frame member 15 except that they have a negative trail. The front plates 19 are interconnected by a bar 23 which is pivotally connected to the respective plates 19 at its ends through a respective pivot pin 22 positioned on a rearward side of the pivot pins 18. Similarly the rear plates 19 are interconnected by a bar 30 pivotally connected at its ends to the respective plates 19 through pivot pins 34 which are positioned on a forward side of the pivot pins 35.

Accordingly, the castor mounted front and rear wheels are generally mirror images of each other. A pair of solenoids 25 and 28 are respectively mounted on the frame 11 adjacent the bars 23 and 30. The solenoids 25 and 28 each include a spring loaded latch pin which, when the wheels are directed parallel to the axis of the wheelchair 10, project into recesses of the bars 23 and 30 respectively, thereby preventing movement of the bars. Upon actuation of the solenoid 25 or 28 the latch pin thereof is drawn from the hole in the bar which is then free to move.

Figure 9:
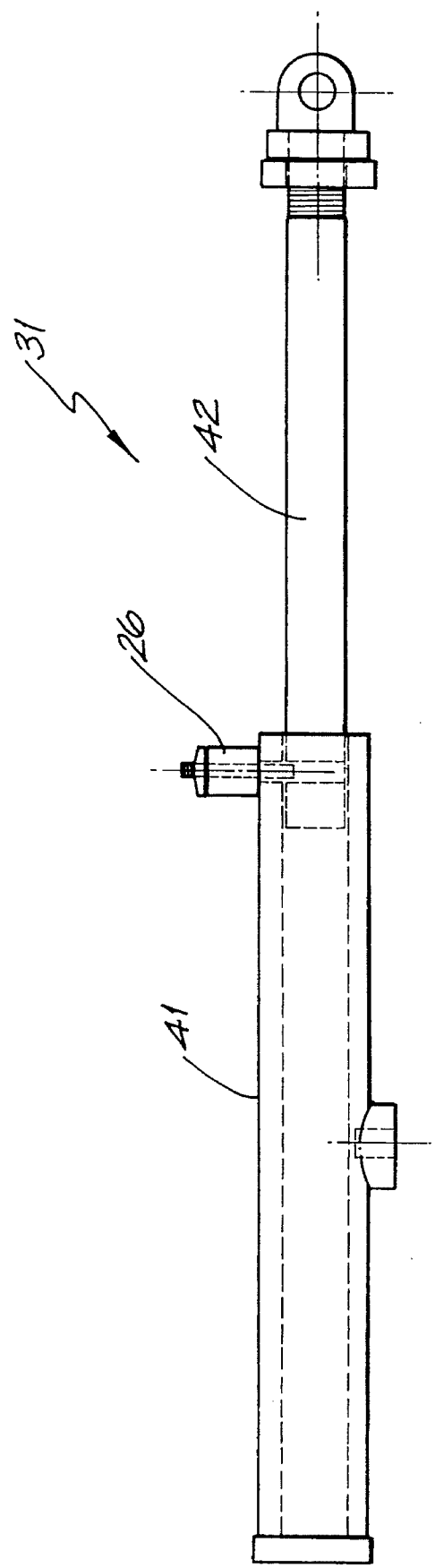
FIG. 9 is a longitudinal sectional view through a strut of adjustable length.

Further, the steering of the front wheels 13 is linked to that of the rear wheels 12 through a linkage mechanism. The mechanism includes an elongate rod 33 pivotally connected by pin 39 to the longitudinally extending frame member 14. At its front end the rod 33 is connected to the right hand front plate 19 via a strut 34. That is, the strut 34 is pivotally connected to the pivot pin 22 of the plate 19 and at the other end to the rod 33 through a pivot pin 40. The other end of rod 33 is pivotally connected to one end of a strut 31 by a pivot pin 38. The other end of the strut 31 is pivotally connected to a rearward extension of the rear left hand plate 19 with a pivot pin 37. The strut 31 comprises, as is seen in FIG. 9, a tube 41 in which slides a rod 42. A solenoid 26 is disposed on the tube 41 and has a sprung biased latch pin adapted to project through a hole in tube 41 and into a suitably dimensioned hole in the rod 42. If the solenoid 26 is actuated the latch pin is withdrawn and the rod 42 can slide freely in the tube 41.

The rod 33 is also connected by pivot pin 37 to a strut 32 which is similar to strut 31 and which is provided with a solenoid actuated latch pin 27. The strut 32 is completed at its other end to pivot pin 34 of the rear right plate 19.

The wheelchair of FIGS. 7 and 8 may be steered in five different modes. In the first mode, all of the solenoids 25, 26, 27 and 28 are unactuated so that the respective latch pins of those solenoids will prevent any movement of the bars 23 and 30. The wheelchair 10 can thus only proceed in a straight line backwards and forwards.

In the second steering mode, the solenoid 25 is actuated. This allows the front wheels 13 of the wheelchair to be steered as has been described with reference to the wheelchair 10 of FIGS. 1 to 5 with the left hand motors being operated in parallel and the right hand motors being operated in parallel.

In the third steering mode the solenoid 26, 27, 28 are actuated so as to be disengaged with the solenoid 25 remaining unactuated. This allows the wheelchair to be steered by the rear wheels 12 only (ie with the start wheels locked in the straight forward position) in a manner analogous with the front wheel steering described above.

If the solenoids 25, 27 and 28 are activated but solenoid 26 left unactuated a fourth mode of steering is possible. If the left hand front motor and the right hand rear motors are driven in parallel and the right hand front motor and the left hand rear motor are driven in parallel then a "circling" type of steering is obtained as is seen in FIG. 7. In this arrangement the strut 31 is maintained of fixed length by the latch pin of solenoid 26, whilst the strut 32 may vary in length as the wheels pivot.

The fifth mode of steering is obtained by actuating the solenoids 25, 26 and 28 to withdraw their respective latches while maintaining solenoid 27 in the latched condition. If the left hand pair of motors and the right hand pair of motors are each independently driven in parallel then the "crab walking" steering of FIG. 8 is obtained. In this case the length of strut 32 is fixed whilst strut 31 may vary in length.

It will be appreciated that the linkage mechanism described above is merely intended to keep the pivoting movement of each of the front and rear wheels 13, 12 synchronised so as to minimise scrubbing of the tires and so that the pivoting movements of the wheels 12, 13 are more predictable and controlled, even under adverse conditions such as rough terrain or where there is increased rolling resistance for one or more wheels (e.g., which are running on soft sand) compared with that of the other wheels (e.g., which are running on hard concrete).

This aim may be achieved in numerous other ways than the mechanical linkage described above. For example, hydraulic connections with appropriate valving may be more efficient and reliable, and require less space than the mechanical linkage. Alternatively, an electronic control arrangement may be used. That is, the electric motors may be equipped with quadrant "in-coding" so as to effectively link the rotational movement (or other quantifiable parameter) of the wheels 12, 13. This last electronic alternative may be desirable and convenient since it is envisaged to drive the motors with the maximum available voltage at all times, and to control the speed of rotation of each wheel 13, 12 by rapidly switching the power. In this way-each motor is driven at a speed which is directly related to the proportion of time that the motor is actually connected to the power supply. During the time periods where the motor is not connected to the power supply, the back EMF produced by the momentum of the wheels 12, 13 driving the respective motors, may be used to detect the speed of each of the wheels 12, 13 at any given time, whereby the controller can either increase or decrease the proportion of time that the motor is connected to the power supply to thereby increase or decrease its rotational speed and thereby effect a desired speed.

Figure 10:
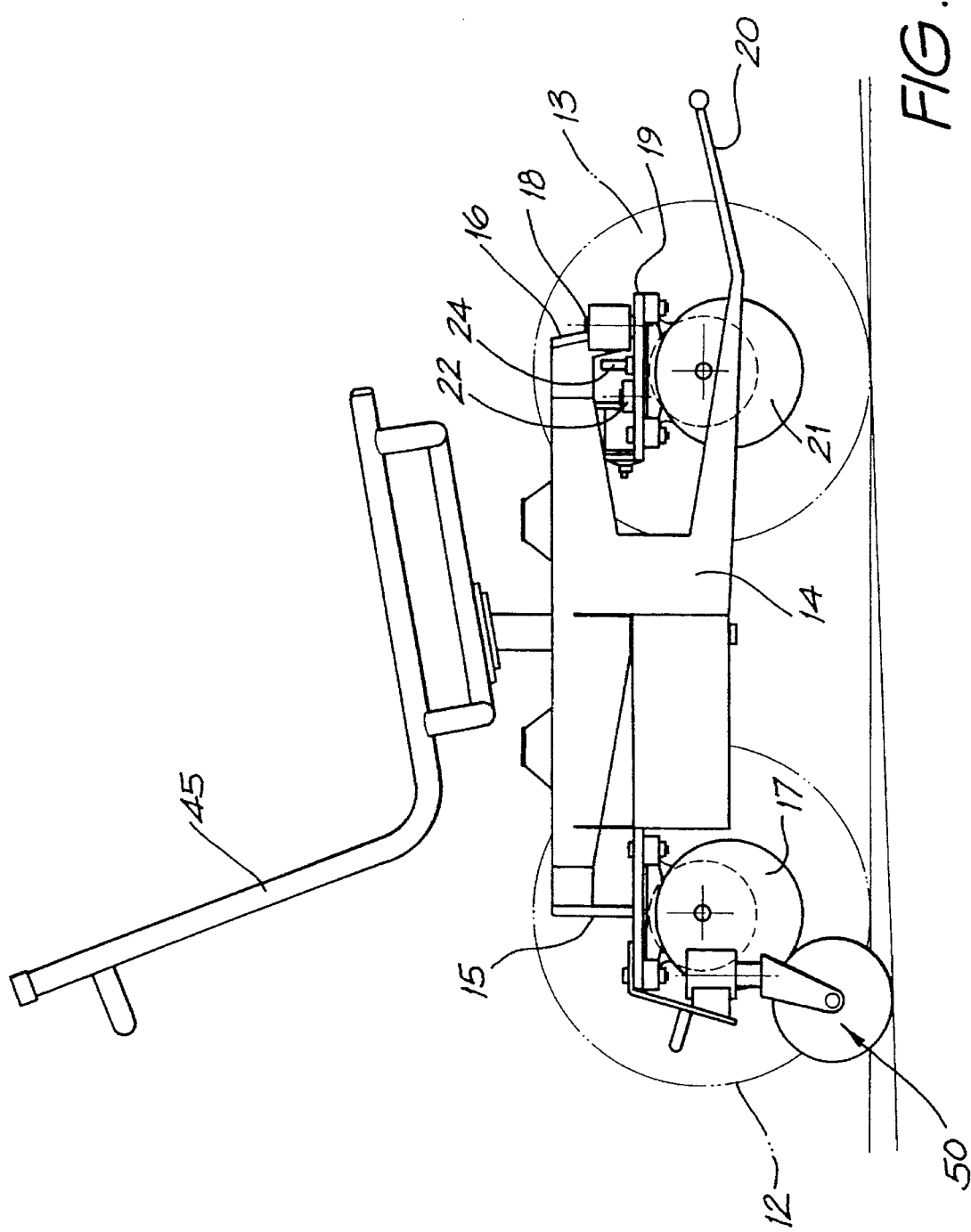
FIG. 10 is a schematic side elevational view of the wheelchair of FIG. 2 further comprising a dolly wheel at the rear end of the frame.
Figure 11:
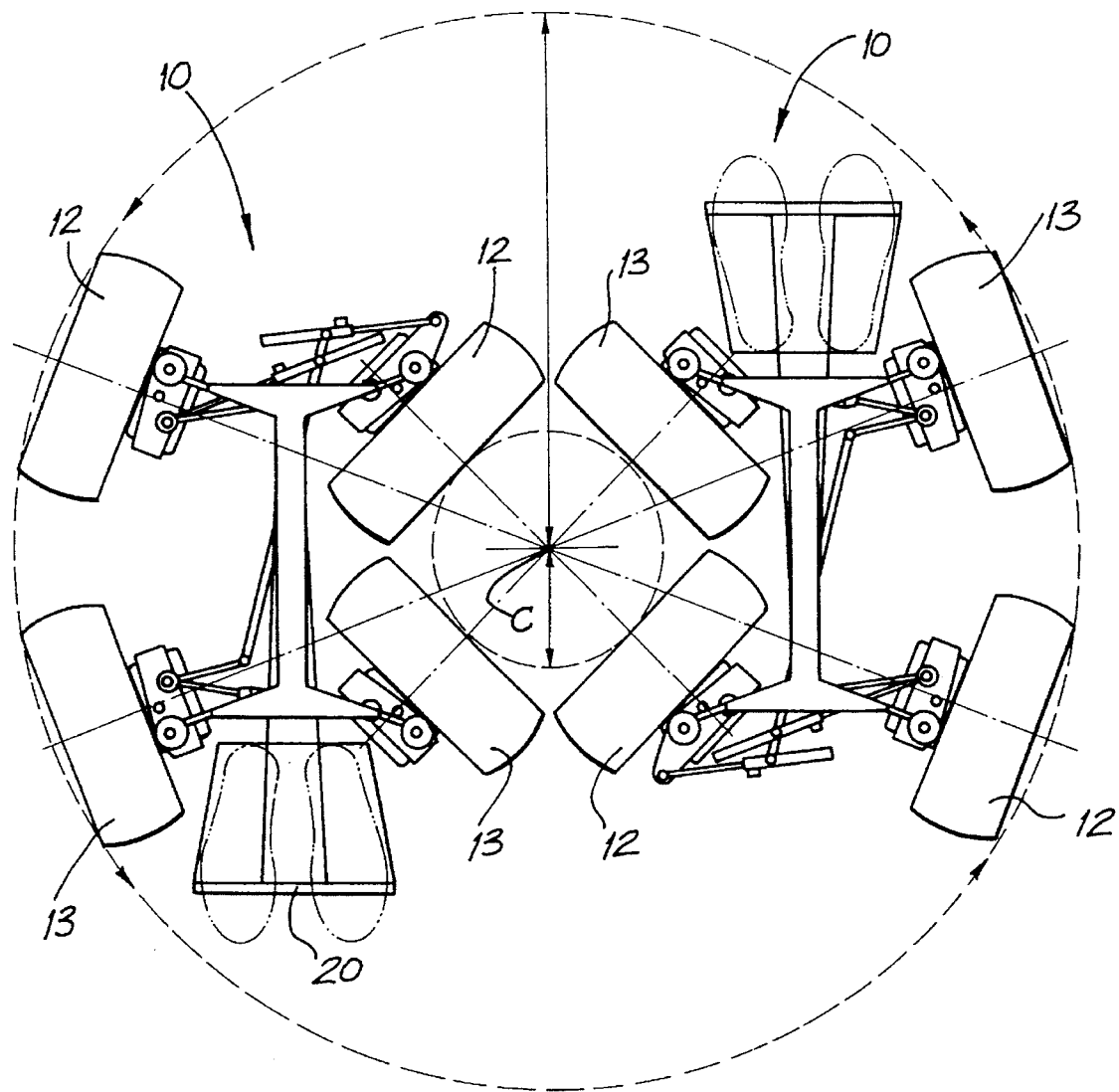
FIG. 11 is a schematic plan view of the four wheel steer wheelchair of FIG. 7 in circling mode and showing the turning circle achieved in this mode.

Referring now to FIG. 10, there is shown the front wheel steer arrangement of FIGS. 1–5, wherein the wheelchair 10 further comprises a "dolly" wheel 50 mounted to the rear of the frame 11. The dolly wheel 50 is selectively movable between a retracted position spaced from the ground surface 1 so as not to interfere with the normal four wheel drive operation of the wheelchair 10, and an extended position bearing against the ground surface wherein the rear wheels 12 are raised out of contact with the ground surface 1, and whereby the rear wheels 12 are operatively disconnected from their respective motors 17. When the dolly wheel 50 is caused to be in the extended position, the front wheels 13 are also caused to be in a straight forward orientation and locked therein by de-actuation of the solenoid/latch pin 25.

It will be appreciated that, in an alternative arrangement, the dolly wheel 50 may be mounted to the front of the frame 11 so that in the extended portion of the dolly wheel 50, the front wheels 13 are spaced from the ground surface 1 are operatively disconnected from their respective motors 21. In this alternative the rear wheels 12 are used to drive the vehicle 10. This alternative arrangement is perhaps more desirable since the rear wheels 12 are already fixed in the straightforward position.

When the dolly wheel 50 is in the extended position, the wheelchair 10 can be operated in much the same way as a conventional two wheel drive wheelchair. This mode of operation may be selected, for example, for indoor use to provide increased manoeuvrability, and thereby provide an inexpensive alternative to the four wheel steering arrangement of FIGS. 7 and 8. Of course the four wheel drive/two wheel steer arrangement of FIGS. 1–5 may still be selected for outdoor use, and particularly for rough terrain, or indeed any other terrain where conventional narrow wheeled, two wheel drive wheelchair arrangements cannot be effectively used.

Furthermore, the dolly wheel 50 may also be provided in the four wheel steer embodiment shown in FIGS. 7 and 8.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

I claim:

1. A wheelchair comprising:

a frame, with a pair of front wheels and a pair of rear wheels movably supporting the frame, and a seat and a footrest mounted on the frame;

a motor drivably connected to each wheel for rotating that wheel in its vertical plane;

a steering means wherein at least the front pair of wheels is castor mounted on the frame so that each wheel freely pivots about a respective vertical axis, the steering means further comprising a linkage means connecting the pair of castor mounted wheels so that the castor mounted wheels pivot generally in unison, and control means to control power to be independently delivered to each of the wheels to steer the wheelchair; and wherein the frame comprises a slender, longitudinally extending intermediate portion with front and rear end portions at respective opposite ends thereof, the front and rear pairs of wheels being mounted to the front and rear end portions respectively; wherein the footrest is mounted to the front end portion of the frame, is positioned between a forward portion of each of the front pair of wheels, and has a width which is greater than that of the intermediate portion of the frame which is positioned between a rearward portion of each of the front pair of wheels; and wherein each one of the castor mounted front wheels has a positive trail with a horizontal axis about which the wheel rotates, being spaced from and on a rearward side of the vertical pivotal axis about which it pivots so as to maximize the pivotal movement of the front wheels while not allowing the wheels to interfere with the footrest or the frame.

2. A wheelchair as claimed in claim 1 wherein each castor mounted wheel is rotatable in a generally vertical plane which is laterally spaced from the vertical pivotal axis of that wheel.

3. A wheelchair as claimed in claim 2 wherein the linkage means is a rigid elongate bar pivotally connected to the castor mounting of each one of the pair of castor mounted wheels, the pivotal connections to the elongate bar being in each case about a second vertical axis which is laterally spaced from the vertical pivotal axis of the respective castor mounted wheel.

4. A wheelchair as claimed in claim 3 wherein the vertical pivotal axes of the pair of castor mounted wheels lie in a plane which is generally normal to the longitudinal extent of the frame, and wherein the second vertical axes of the pair of castor mounted wheels are each on the same side of that plane.

5. A wheelchair as claimed in claim 4 wherein the rigid elongate bar is generally parallel to that plane, and wherein a spacing between the second vertical axes is smaller than a spacing between the respective vertical pivotal axes of the pair of castor mounted wheels.

6. The wheelchair as claimed in claim 1 wherein the pivotal movement of the pair of castor mounted wheels is limited by a stop means between a full left lock position and a full right lock position to prevent either one of the castor mounted wheels from contacting the frame, the footrest or any other part of the vehicle during operation of the steering means.

7. The wheelchair as claimed in claim 1 wherein the front wheels only of the wheelchair are castor mounted, and the rear wheels are fixed against pivoting relative to the frame.

8. The wheelchair as claimed in claim 7 wherein there is a further wheel retractably mounted on the frame near the front wheels or the rear wheels, the further wheel being movable between a retracted position spaced from a surface on which the front and rear wheels are supported, and an extended position bearing against the surface and supporting the wheelchair so that the front wheels or the rear wheels are spaced from the surface, the further wheel being castor mounted so as to be freely pivotal about a further vertical axis and freely rotatable about a horizontal axis.

9. The wheelchair as claimed in claim 6 wherein the front wheels are selectively lockable against pivotal movement when orientated in a straight forward position relative to the frame.

10. The wheelchair as claimed in claim 9, wherein there is a further wheel retractably mounted on the frame near the front wheels or the rear wheels, the further wheel being movable between a retracted position spaced from a surface on which the front and rear wheels are supported, and an extended position bearing against the surface and supporting the wheelchair so that the front wheels or the rear wheels are spaced from the surface, the further wheel being castor mounted so as to be freely pivotal about a further vertical axis and freely rotatable about a horizontal axis, and wherein there is provided a switch means operatively interconnecting the operation of the further wheel, the motors driving the rear wheels, and the steering means of the front wheels so that when the further wheel is in the retracted position, the rear wheels remain drivably connected to the respective motors and the steering means of the front wheels is freely pivotal about the respective vertical axes, and when the further wheel is moved into the extended position, the front wheels or the rear wheels are operatively disconnected from the respective motors and the steering means of the front wheels is caused to be locked in the straight forward position relative to the frame.

11. The wheelchair as defined in claim 1 wherein both the front and the rear wheels are castor mounted and are operatively linked for synchronised pivotal movement, whereby either both the front and rear wheels pivot in the same direction relative to the frame towards the left or right full lock positions for crab-like movement of the wheelchair, or the front wheels pivot to the left whilst the rear wheels pivot to the right, or vice versa, for circling movement of the wheelchair.

12. The wheelchair as claimed in claim 11 wherein the left front wheel and the left rear wheel are operatively linked so as to be driven together, and the right front wheel and the right rear wheel are operatively linked so as to be driven together to effect the crab-like movement of the wheelchair, or alternatively the left front wheel and the right rear wheel, and also the also the left rear wheel and the right front wheel, respectively, are operatively linked to effect the circling movement of the wheelchair.

13. The wheelchair as claimed in claim 12 wherein the linking between the front and rear wheels provides both for crab-like movement of the wheelchair and for circling movement of the wheelchair.

14. The wheelchair as claimed in claim 1 wherein the spacing between the horizontal axis and the respective vertical axis is less than a diameter of the wheel.

15. A wheelchair as claimed in claim 2 wherein each of the motors is geared.

* * * * *